United States Patent [19]

Fiala

[11] Patent Number: 5,287,786

[45] Date of Patent: * Feb. 22, 1994

[54] PORTABLE ELECTRIC CUTTING AND SCORING SAW

[76] Inventor: Paul E. Fiala, 7205 Shadyoak Dr., Downey, Calif. 90240

[*] Notice: The portion of the term of this patent subsequent to Nov. 3, 2009 has been disclaimed.

[21] Appl. No.: 932,600

[22] Filed: Aug. 20, 1992

Related U.S. Application Data

[63] Continuation-in-part of Ser. No. 745,412, Aug. 15, 1991, Pat. No. 5,159,870.

[51] Int. Cl.⁵ .............................................. B27B 9/00
[52] U.S. Cl. ........................................ 83/863; 30/374; 30/388; 30/DIG. 1; 83/13; 144/3 R
[58] Field of Search ............... 83/13, 14, 39, 863, 83/864; 144/3 R, 368; 30/374, 388, DIG. 1, 500; 320/2; 310/50

[56] References Cited

U.S. PATENT DOCUMENTS

| | | | |
|---|---|---|---|
| 3,120,777 | 2/1964 | Genin | 83/863 |
| 4,181,164 | 1/1980 | Meniconi | 144/3 R |
| 4,245,390 | 1/1981 | Bond | 30/374 |
| 4,555,849 | 12/1985 | Ando et al. | 30/388 |
| 4,706,535 | 11/1987 | Ducharme | 83/863 |
| 5,117,722 | 6/1992 | Letendre | 83/863 |
| 5,136,910 | 8/1992 | Kuhn et al. | 83/863 |
| 5,148,732 | 9/1992 | Striebig | 83/863 |
| 5,159,870 | 11/1992 | Fiala | 83/863 |

FOREIGN PATENT DOCUMENTS

| | | | |
|---|---|---|---|
| 0129754 | 1/1985 | European Pat. Off. | 30/374 |
| 0324444 | 7/1989 | European Pat. Off. | 30/388 |

*Primary Examiner*—Hien H. Phan
*Attorney, Agent, or Firm*—Howard A. Kenyon

[57] ABSTRACT

A portable electric cutting and scoring saw for use on laminated or veneer products is disclosed. The scoring saw is disposed in front of the cutting saw and turns in the opposite direction. The saw is designed primarily for the craftsman cabinet maker where the use of large industrial bench saws is not feasible. In one embodiment, the scoring saw cuts at a fixed depth and the cutting saw depth of cut can be varied by changing the blade with one of a different diameter. In another embodiment, the cutting and scoring saw depth of cut and angle of cut can be adjusted simultaneously with depth and tilt adjustments. In addition, in this embodiment, the saw motor can be easily removed and replaced with one of different horsepower and R.P.M. In yet another embodiment the electric motor has a battery power-pack attached thereto that can be readily recharged. The battery power-pack makes the portable electric cutting and scoring saw completely self contained.

24 Claims, 4 Drawing Sheets

PORTABLE ELECTRIC CUTTING AND SCORING SAW

CROSS REFERENCE TO RELATED APPLICATION

The present application is a continuation-in-part of my co-pending application, Ser. No. 07/745,412 filed Aug. 15, 1991 for Portable Electric Cutting and Scoring Saw, now U.S. Pat. No. 5,159,870.

BACKGROUND OF THE INVENTION

1. Field of the Invention

The present invention relates in general to a portable electric cutting and scoring saw to be used by an experienced cabinet maker where laminates or veneers that are to be cut lie on the top surface or on the top and bottom surfaces of a workpiece.

2. Description of the Prior Art

There are many cutting and scoring saws of the large industrial bench type available on the market. These bench type cutting and scoring saws are designed for a factory that manufactures furniture or kitchen cabinets. Some of these manufacturers are Altendorf, Grand Rapids, Mich.; Frama-Tech Inc., Paramount, Calif.; Magic s.p.a., Modena, Italy; Kunang Yung Machinery Co. Ltd, Taiwan R.O.C.; Holz, Jersey City, N.J. and Griggio, Palova, Italy.

All of these above companies manufacture equipment that have a separate motor for the cutting and scoring saw; some of the cutting saws use motors as large as 10 H.P. U.S. Pat. No. 4,706,535 describes and claims a scoring saw assembly for use with a conventional bench saw having a table with a longitudinal opening.

In addition, there are portable saws with devices attached thereto that provide a sharp scoring wheel mounted ahead of the cutting saw that cuts into the outer surface. U.S. Pat. No. 4,245,390 describes a scoring attachment on a spring arm that forces the wheel into the surface as the portable saw is pushed across the workpiece. U.S. Pat. No. 4,711,147 describes an attachment containing two scoring wheels mounted ahead of the cutting saw where the two wheels score a width equal to the saw cut. Again, the saw must be pushed by the operator and the scoring wheels are spring biased. None of the above patents have a portable powered scoring saw as in the present invention that is also adjustable for depth and angle of cut. In addition, none of the above patents have a portable powered scoring saw as in the present invention that contains a removable and replaceable motor and also a battery power-pack. What is needed is a portable electrical powered cutting saw in combination with a powered scoring saw that can be used on-the-job by a skilled cabinet maker when cutting laminates or veneer. Accordingly, a fuller understanding of the invention may be obtained by referring to the summary of the invention and the detailed description of the invention, in addition to the scope of the invention defined by the claims taken in conjunction with the accompanying drawings.

SUMMARY OF THE INVENTION

It is the object of the present invention to provide a portable electric cutting and scoring saw.

It is another object of the present invention to provide a portable electric cutting and scoring saw where the cutting blade and scoring blade turn in opposite directions.

It is yet another object of the present invention to have the cutting saw and scoring saw lie in the same plane.

It is still another object of the present invention where the scoring saw cut is wider than the cutting saw cut.

It is another object of the present invention where the depth of cut and the angle of cut can be adjusted.

It is yet another object of the present invention where the motor can be easily removed and replaced to obtain a change in horsepower and R.P.M.

It is another object of the present invention to use a rechargeable battery power-pack attached to the electric motor to drive the electric motor which makes the present invention completely portable and self contained.

Briefly, in accordance with the present invention, there is provided a portable cutting and scoring saw that is used primarily by a cabinet maker that must custom-make laminate or veneer workpieces on-the-job. The saws blades are attached to shafts that are fitted with ball bearings and placed inside a casing. The saw shafts contain helical gears that mesh with helical gears attached to electrical power means. The saws in one embodiment are fixed where the scoring saw cuts a depth of ⅛ inch and the cutting saw can cut a depth of ¾ to 1¾ inches depending on the diameter of the cutting saw blade. It is estimated that these cutting depths will cover a good portion of all the requirements that a on-the-job cabinet maker will have. The saws in another embodiment utilize a depth of cut adjustment and an angle of cut adjustment. In addition, in this embodiment, the motor can be removed and replaced with a motor of different horsepower and R.P.M. The cutting saw plane lies inside the scoring saw plane and the scoring saw blade has approximately a 0.002 inch width on each side of the cutting saw blade.

The novel features which are believed to be characteristic of the invention as to the system together with future objects and advantages thereof, will be better understood from the following description in connection with the accompanying drawings in which the presently preferred embodiments of the invention is illustrated by way of example. It is to be expressly understood, however, that the drawings are for purposes of illustration and description only, and are not intended as a definition of the limits of the invention.

DETAILED DESCRIPTION OF THE INVENTION

Figure 1:
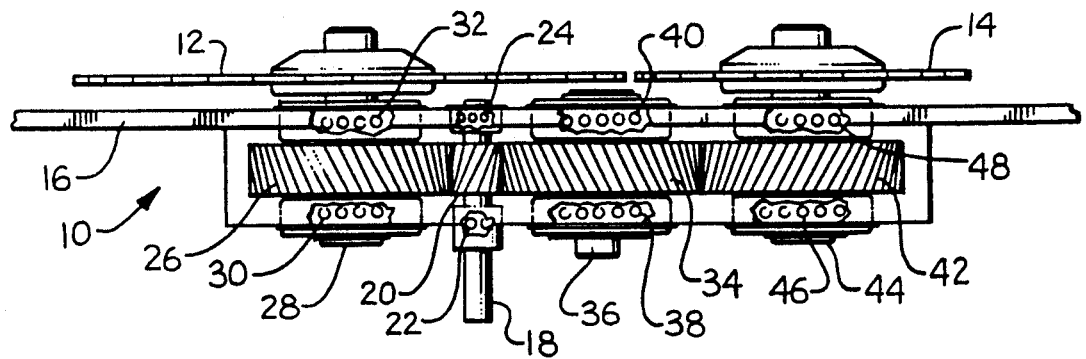
FIG. 1 is a cut away view that shows the drive shaft, helical gears, ball bearings with the cutting and scoring saws lying in the same plane.

Turning now to FIG. 1 there is shown a cutaway drawing 10 of the cutting saw 12, scoring saw blade 14 and a member of the gearbox housing 16. Also shown is drive shaft 18 that is attached to a motor (not shown) in the motor housing 64 in FIG. 4. Drive shaft 18 contains drive gear 20 and drive shaft bearings 22 and 24. Drive gear 20 is in meshing relationship with cutting saw gear 26 which is fitted on cutting saw shaft 28. Cutting saw shaft 28 contains bearings 30 and 32. Drive gear 20 is also in meshing relationship with idler gear 34 which is fitted on idler gear shaft 36. Idler gear shaft 36 contains bearings 38 and 40. Idler gear 34 is in meshing relationship with scoring saw gear 42 which is fitted on scoring saw shaft 44. Scoring saw shaft 44 contains bearings 46 and 48. Drive shaft 18 is driven such that the minimum speed is 20,000 R.P.M. The drive shaft gear 18 provides a 4 to 1 relationship with the cutting saw gear 26 and idler gear 34. Since the scoring saw gear 42 and the idler gear 34 are the same diameter, the minimum speed of the cutting saw 12 and scoring saw 14 is 5,000 R.P.M. It is noted that the gears 20, 26, 34 and 42 are all helical gears. It was determined that this type of gear is best suited for high speed which is required for the scoring saw 12. The bearings 30, 32, 22, 24, 38, 40, 46 and 48 are all self-lubricating types.

Figure 2:
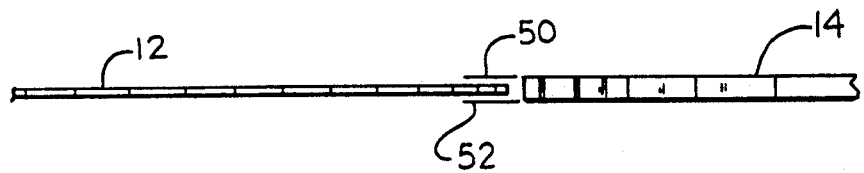
FIG. 2 shows the scoring saw blades and cutting saw blades relative thickness.

Turning now to FIG. 2 there is seen an exaggerated edge profile of the cutting saw 12 and scoring saw blade 14. The thickness of the scoring saw 14 is 0.004 inches greater than that of the cutting saw blade 12. Since the center plane of the cutting saw blade 12 and the center plane of the scoring saw blade 14 lie in the same plane, the scoring saw 12 thickness is approximately 0.002 inches greater on each side than the thickness of the cutting saw blade 14. This is shown by 50 and 52 in FIG. 2 which is an edge view of the portable electric cutting and scoring saw.

Figure 3:
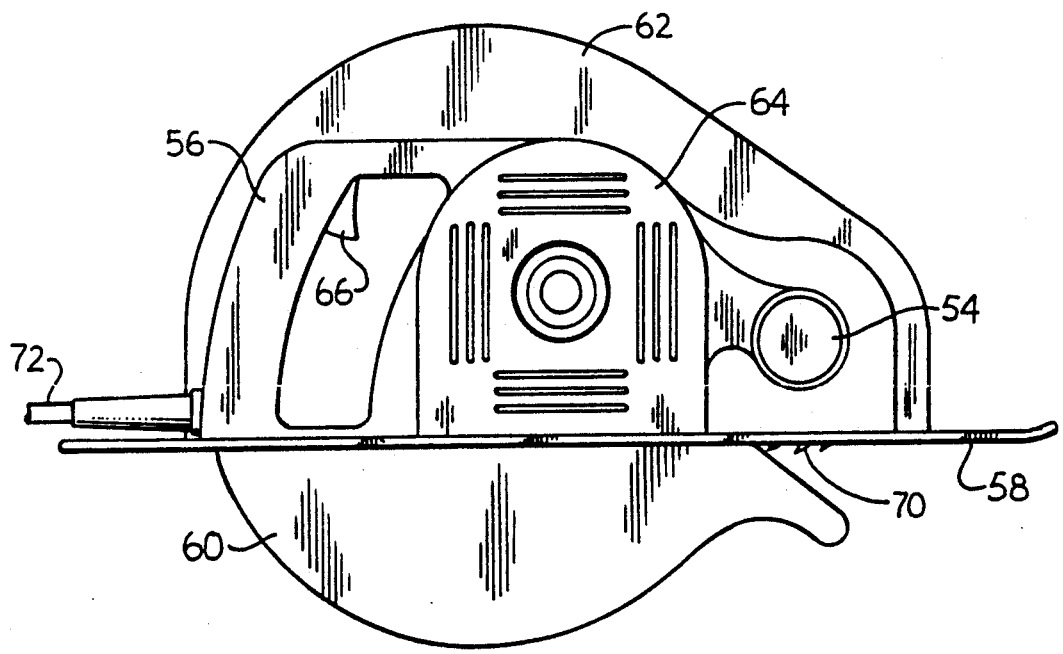
FIG. 3 is a side view showing the motor, housing, saw handles and the bottom part of the blade guard.

Turning now to FIG. 3, there is shown a front handle 54, a blade guard 60, a saw housing 62, and a motor housing 64. Trigger switch 66 which is spring biased is shown fitted in handle 56. Scouring teeth 70 can be seen protruding below the base plate guard 60. The power cord 72 can be seen at the bottom of handle 56. Although it is not shown, the electric motor could be powered by a rechargeable battery.

Figure 4:
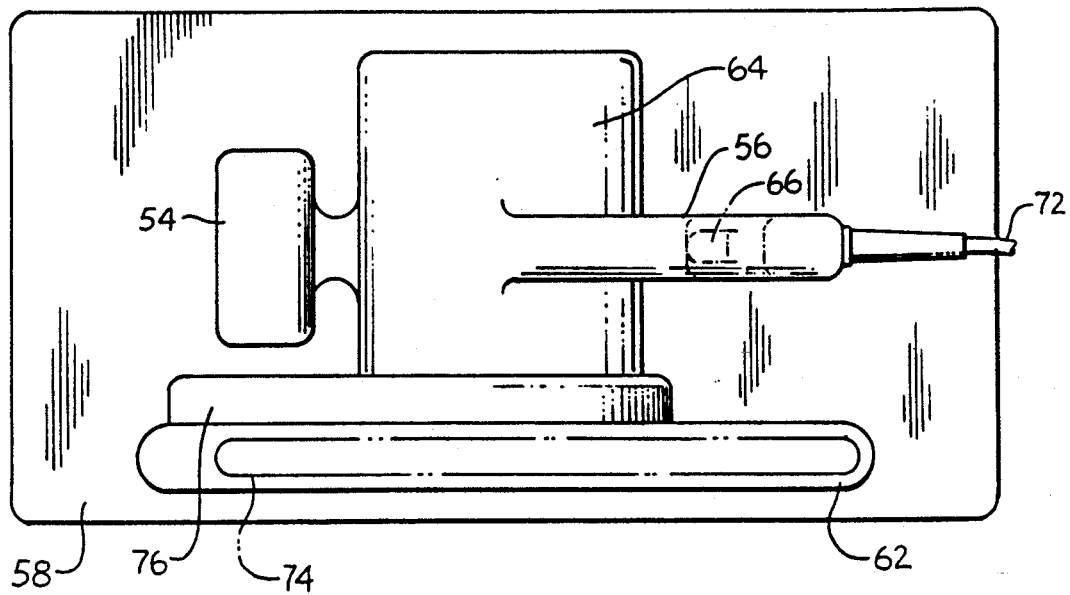
FIG. 4 is a top view of the scoring and cutting saw assembly.

FIG. 4 shows a top view of the portable electric cutting and scoring saw. Base plate 58 contains a groove 74 where the scoring saw blade 14, cutting saw blade 12 protrudes, and blade guard 60 rotates. Also seen in this view is the saw housing 62, the gear housing 76, motor housing 64, front handle 54 and rear handle 56. Trigger switch 66 is shown in phantom and power cord 72 is also shown.

Figure 5:
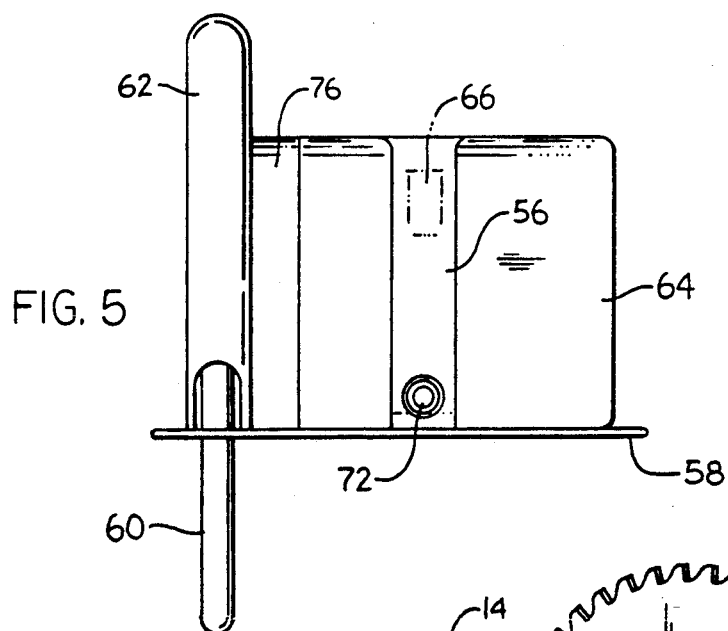
FIG. 5 shows a rear view of the scoring and cutting saw assembly.

FIG. 5 shows the rear view of the portable electric cutting and scoring saw. Base plant 58, motor housing 64, saw housing 62, gear housing 76, and blade guard 60 are also shown in this view. Rear handle 56, trigger switch 66 shown in phantom, and power cord 72 is also shown.

Figure 6:
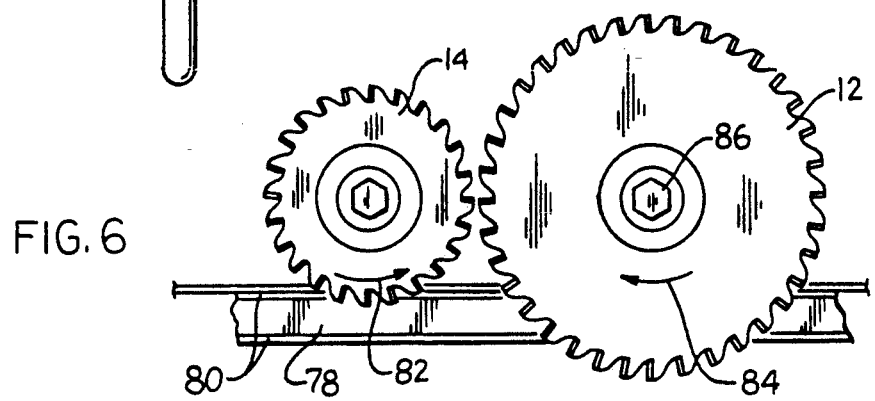
FIG. 6 shows the two blades in relation to each other.

FIG. 6 shows an isolated view of the scoring saw blade 14 and cutting saw blade 12. The blades rotate in opposite direction as indicated by the arrows 82 and 84 on the face of the scoring saw blade 14 and cutting saw blade 12. A workpiece 78 with a laminate or veneer 80 bonded thereto is shown being cut by the portable electric cutting saw blade 12 and scoring saw blade 14. The laminate or veneer 80 is shown bonded to both sides of the workpiece 78. However, on most of the on-the-job tasks, the laminate or veneer 80 will be bonded to the top side of the workpiece 78. The diameter of the scoring saw blade 14 is fixed at 3⅜ inches which allows a cutting depth of ⅛ inch. The cutting saw 12 depth of cut varies from ¾ inch to 1¾ inches. Blade diameters available are 4½, 5, 5½, 6 and 6½ inches. The 4½ inch diameter blade provides a ¾ inch depth of cut and the 6½ inch blade provides a 1¾ inch depth of cut. Since neither blade is adjustable in one embodiment, the only way the blade depth can be varied is by changing blades. Retaining nut 86 must be removed, the desired blade placed on shaft 28 and the retaining nut 86 replaced and tightened to obtain a different depth of cut. It is estimated that a depth of cut from ¾ inch to 1¾ inches will cover a good portion of the requirements of an on-the-job cabinet maker. The operation of the portable electric cutting and scoring saw is such that the scoring saw blade 14 leads into the workpiece. The scoring saw blade 14 and the cutting saw blade 12 turning in the opposite direction allows the scoring saw blade 14, whose thickness is greater than the cutting saw blade 12, to provide a path whereby the laminate 80 bonded to workpiece 78 will be cut smoothly without any chipping or tearout.

Figure 7:
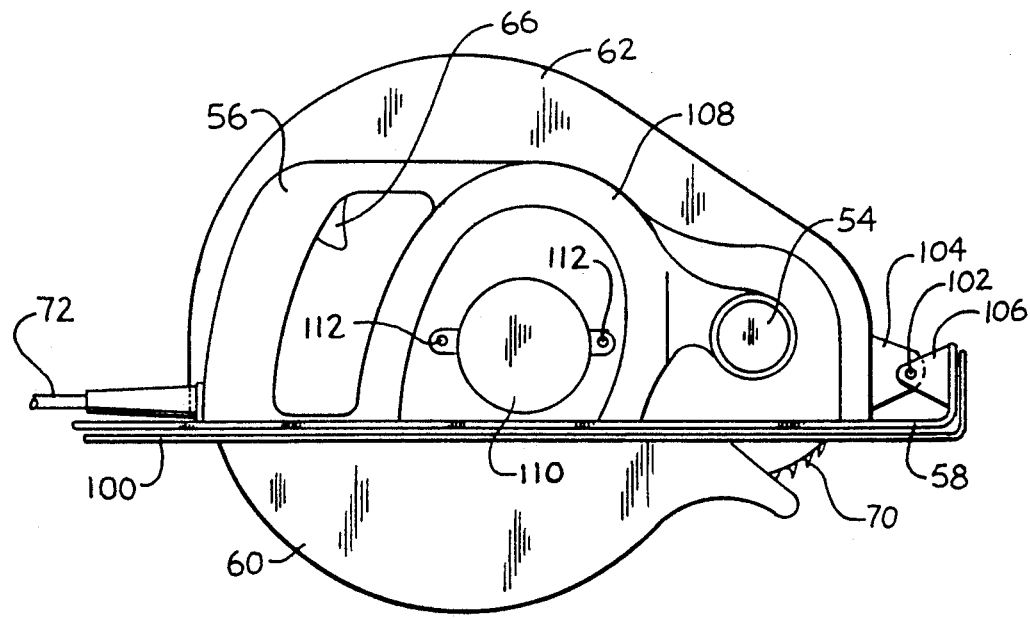
FIG. 7 is a side view showing the removable motor, housing, saw handles, bottom part of the blade guard, the base plate and also showing pivot points for tilt or angle adjustment.

Turning now to FIG. 7, there is seen another embodiment which is similar to the embodiment shown in FIG. 3, except that tilt and depth adjustments have been added. Bracket 104 has been added to provide pivot points for both tilt and depth on the front end of the saw. An adjusting slot 101 is provided in bracket 100 to adjust the depth of cut to the cutting saw blade 12 and the scoring saw blade 13. An adjusting slot 107 is provided in bracket 106 to allow the saw assembly to be tilted up to 45 degrees. This view also shows a different type of motor housing 108 which is adapted to allow motor 110 to be removed and replaced by quick change bolts 112. In this manner a motor of different horsepower and R.P.M. may be tailored to the type of material being cut.

Figure 8:
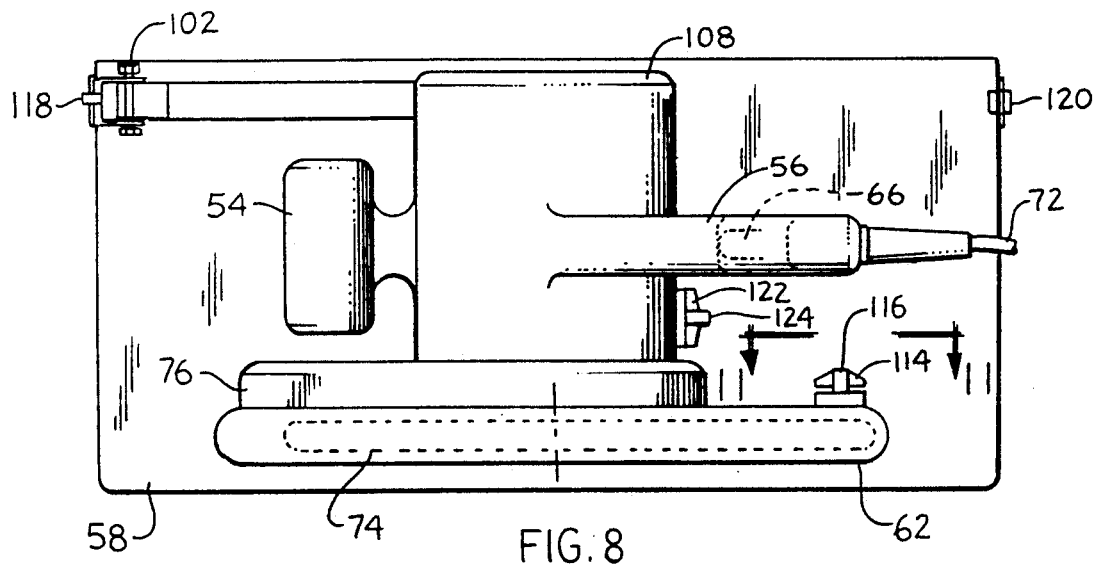
FIG. 8 is a top view of the scoring and cutting saw assembly showing the pivot point for depth adjustments.

FIG. 8 shows a top view of the cutting and scoring saw assembly and pin 102 which provides the axis for the depth adjustment. The adjusting slot 101 in bracket 100 allows the depth of cut to be secured by tightening wing nut 114 on bolt 116 fixed to housing 62. In FIG. 8 there is also seen pivot pins 118 and 120 that allow the saw assembly to tilt with respect to the base plate 58. The adjusting slot 107 in bracket 106 allows the tilt angle to be secured by tightening locking nut 122 on screw 124.

Figure 9:
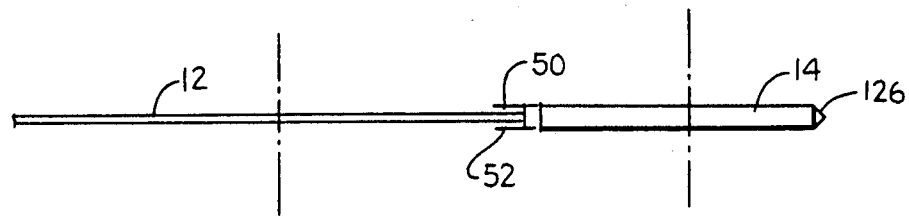
FIG. 9 shows the cutting and scoring blades in relation to each other and also showing a conical scoring saw tooth.

FIG. 9 is the same as FIG. 2 except there is shown a conical type tooth 126 on the scoring saw blade which is the preferred type of tooth for the scoring saw blade in all embodiments.

Figure 10:
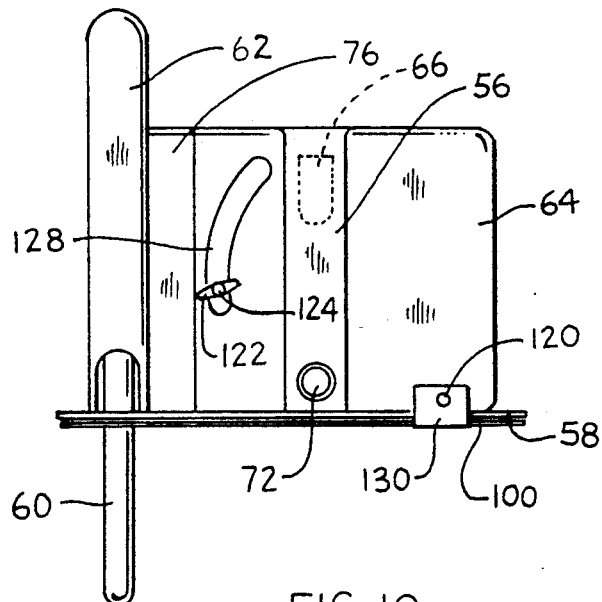
FIG. 10 shows a rear view of the scoring and cutting saw assembly and also showing the depth adjustment slot and a pivot point for the angle adjustment.

FIG. 10 shows a rear view of the cutting and scoring saw assembly. Seen in this view is pivot pin 120, bracket 100 with adjusting slot 101, locking wing nut 122, and bolt 123. Bracket 130 containing a pin 120 is attached to base plate 58. Bracket 100 with adjusting slot 101 provided the depth adjustment to the cutting and scoring saw.

Figure 11:
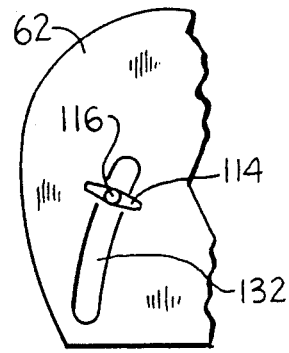
FIG. 11 is an isolated view showing the tilt adjustment bracket and depth adjustment slot.

FIG. 11 is an isolated view of the tilt adjustment bracket 106 shown on FIG. 8, which shows the adjusting slot 107 and the pivot point for pin 118.

Figure 12:
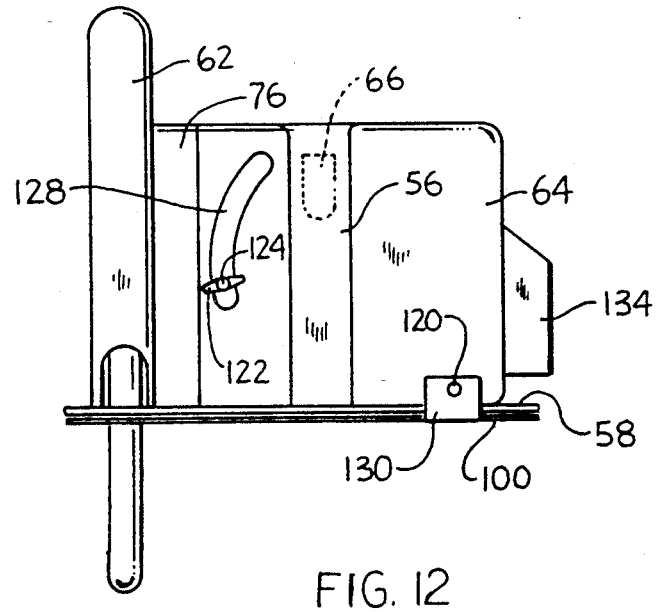
FIG. 12 is the same view as FIG. 10 but also shows a battery power-pack.

FIG. 12 is the same view as FIG. 10 with the exception of an attached battery power-pack 134. The battery power-pack is at least a 9.6 volt power-pack and is removed and recharged as required.

The present disclosure included that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without department from the spirit and scope of the invention.

What is claimed is:

1. A method of cutting a workpiece having a laminate or veneer on the top side or on the top and bottom side with a portable electric cutting and scoring saw comprising:

providing a housing to contain a high speed electric motor, a set of gears, bearings, a cutting saw shaft, a scoring saw shaft, and an idle shaft, respectively, said blades lying in the same plane, said scoring saw blade is approximately 0.002 inches wider on each side of two planes formed by the cutting saw blade width;

turning said cutting saw and scoring shafts by said high speed electric motor;

gearing said electric motor to said cutting and scoring saw shafts;

using said set of gears to directly drive said cutting saw blade and said scoring saw blade such that the cutting saw blade and scoring saw blade turn in opposite directions at least 5,000 RPM;

providing an adjustment to control the depth of cut;

providing an adjustment to control the angle of cut;

providing a removable and replaceable motor in said housing;

providing a rechargeable battery power-pack to drive said high speed electric motor;

providing a rear handle having an on and off spring biased trigger switch to turn on and off said electric motor, said rear handle also used to push said portable electric cutting and scoring saw across said workpiece;

providing a front handle to guide the cutting and scoring saw;

aligning the cutting and scoring saw with the said workpiece to prepare for the cut;

activating the cutting and scoring saw electric motor by means of a trigger switch;

pushing on said rear handle and guiding said portable cutting and scoring saw by said front handle;

scoring the top surface of said workpiece ahead of said cutting blade allows a smooth cut to be made on said workpiece.

2. A portable electric cutting and scoring saw for use on a workpiece having a top portion and a bottom portion with laminate or veneer bonded to the top portion or the bottom portion comprising:

housing means containing a front handle at one end and a rear handle with a trigger switch on the other end, said housing means having a base plate attached to the bottom of said housing means;

a drive means contained in said housing means;

a drive shaft attached to said drive means;

a cutting saw shaft geared to said drive shaft;

a cutting saw blade connected to said cutting saw shaft;

an idle shaft geared to said drive shaft;

a scoring saw blade connected to said scoring saw shaft;

a scoring saw shaft geared to said idle shaft wherein said cutting saw blade and said scoring saw blade are directly driven by a set of gears;

guard means covering said scoring saw blade and said cutting saw blade;

means to adjust the depth of cut of said cutting saw blade and said scoring saw blade;

means to adjust the angle of cut of said cutting saw blade and said scoring saw blade; and means that allows changing said drive means in said housing means.

3. A portable electric cutting and scoring saw as described in claim 2 wherein said housing means comprises a motor housing, a saw blade housing and a gearbox housing.

4. A portable electric cutting and scoring saw as described in claim 2 wherein said drive means attached to said drive shaft is a high speed electric motor, said high speed electric motor having a quick release mechanism in order to be able to replace said motor with a motor having different horsepower and R.P.M.

5. A portable electric cutting and scoring saw as described in claim 4 wherein said electric motor has a power cord attached thereto.

6. A portable electric cutting and scoring saw as described in claim 4 wherein said electric motor has a battery power-pack attached thereto.

7. A portable electric cutting and scoring saw as described in claim 6 wherein said battery power-pack is at least 9.6 volts.

8. A portable electric cutting and scoring saw as described in claim 4 wherein said quick release mechanism is quick change bolts.

9. A portable electric cutting and scoring saw as described in claim 2 wherein said drive shaft has a helical gear attached thereto.

10. A portable electric cutting and scoring saw as described in claim 2 wherein said cutting saw shaft has a helical gear attached thereto.

11. A portable electric cutting and scoring saw as described in claim 2 wherein said idle shaft has a helical gear attached thereto.

12. A portable electric cutting and scoring saw as described in claim 2 wherein said scoring saw shaft has a helical gear attached thereto.

13. A portable electric cutting and scoring saw as described in claim 2 wherein said drive shaft, said cutting saw shaft, said idle shaft and said scoring saw shaft contain bearings pressed thereon.

14. A portable electric cutting and scoring saw as described in claim 13 wherein said bearings are of the self-lubricating type.

15. A portable electric cutting and scoring saw as described in claim 2 wherein said scoring saw blade and said cutting saw blade lie in the same plane and are in perfect alignment by indexing off of a common surface.

16. A portable electric cutting and scoring saw as described in claim 2 wherein said scoring saw blade contains teeth of the conical design.

17. A portable electric cutting and scoring saw as described in claim 2 wherein said cutting saw blade and said scoring saw blade turn in opposite directions.

18. A portable electric cutting and scoring saw as described in claim 2 wherein said scoring saw blade cuts a depth of ⅛ inch and said cutting saw blade cuts a minimum depth of ¾ inches and a maximum depth of 1¾ inches, said ¾ inch and said 1¾ inches depths obtained by changing said cutting saw blades of different diameter.

19. A portable electric cutting and scoring saw as described in claim 2 wherein said scoring saw blade turns at least 5,000 R.P.M.

20. A portable electric cutting and scoring saw as described in claim 2 wherein said scoring saw blade has a cut width greater than the cut width of said cutting saw blade whereby said scoring saw blade cut width is approximately 0.002 inches on each side of two planes formed by the cutting saw cut width.

21. A portable electric cutting and scoring saw as described in claim 2 wherein said rear handle contains a spring biased trigger switch for turning on said drive means.

22. A portable electric cutting and scoring saw as described in claim 2 whereby said guard means is spring biased and rotates around the shaft of said cutting saw.

23. A portable electric cutting and scoring saw as described in claim 2 wherein said means to adjust the depth of cut of said cutting saw blade and said scoring saw blade is by rotating said base plate about a pivot point and locking said base plate by a lock nut engaging an adjusting slot whereby said cutting saw blade and said scoring saw blade extend at a desired depth.

24. A portable electric cutting and scoring saw as described in claim 2 wherein said means to adjust the angle of cut of said cutting saw blade and said scoring saw blade is by rotating said base plate about pivot points and locking said base plate by a lock nut engaging an adjusting slot whereby said cutting saw blade and said scoring saw blade are at a desired angle.

* * * * *